(12) United States Patent
Deitz et al.

(10) Patent No.: US 6,928,328 B2
(45) Date of Patent: Aug. 9, 2005

(54) INTEGRATED ELECTRONIC SIGNATURES FOR APPROVAL OF PROCESS CONTROL SYSTEM SOFTWARE OBJECTS

(75) Inventors: David L. Deitz, Austin, TX (US); Grant Wilson, Austin, TX (US); Herschel O. Koska, San Marcos, TX (US); Stephen G. Hammack, Austin, TX (US); DeeAnn G. Delguzzi, Pflugerville, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 10/211,903

(22) Filed: Aug. 2, 2002

(65) Prior Publication Data

US 2004/0024477 A1 Feb. 5, 2004

(51) Int. Cl.⁷ .................. G05B 19/4155; G06F 9/445
(52) U.S. Cl. .................. 700/87; 700/86; 717/168; 717/173
(58) Field of Search ................ 717/168–178; 700/86, 87, 17, 19, 21; 713/100; 705/51, 54

(56) References Cited

U.S. PATENT DOCUMENTS

| | | | | |
|---|---|---|---|---|
| 4,827,423 A | * | 5/1989 | Beasley et al. | 700/96 |
| 5,546,301 A | * | 8/1996 | Agrawal et al. | 700/23 |
| 5,602,993 A | * | 2/1997 | Stromberg | 717/173 |
| 5,649,200 A | * | 7/1997 | Leblang et al. | 717/122 |
| 5,903,897 A | * | 5/1999 | Carrier et al. | 707/203 |
| 5,950,209 A | * | 9/1999 | Carrier et al. | 707/203 |
| 6,047,129 A | * | 4/2000 | Frye | 717/172 |
| 6,314,425 B1 | * | 11/2001 | Serbinis et al. | 707/10 |
| 6,381,698 B1 | | 4/2002 | Devanbu et al. | 713/170 |
| 6,385,494 B1 | * | 5/2002 | Blahnik et al. | 700/86 |
| 6,438,432 B1 | * | 8/2002 | Zimmermann et al. | 700/86 |
| 6,449,624 B1 | | 9/2002 | Hammack et al. | |
| 6,647,315 B1 | * | 11/2003 | Sherriff et al. | 700/204 |

OTHER PUBLICATIONS

Examination Report under Section 18(3) issued in GB 0317906.6 application by the United Kingdom Patent Office on Aug. 2, 2004.

* cited by examiner

Primary Examiner—John Follansbee
Assistant Examiner—Aaron Perez-Daple
(74) Attorney, Agent, or Firm—Marshall, Gerstein & Borun LLP

(57) ABSTRACT

A software object authorization system includes the ability to select signers who must approve a software object before it is downloaded to a process control system. The signers are presented with a form allowing them to authenticate their identity with a username and a password. Signers that have authenticated their identity may approve or reject the software object. A software object is authorized when all approvals needed for that software object have been received. Authorized software objects may then be downloaded to the process control system.

41 Claims, 13 Drawing Sheets ized recipe alteration may, at worst, lead to consumer dissatisfaction, unauthorized alteration of recipes used in, for example, pharmaceutical production may have more serious implications. A recipe alteration that changes the quantities or constituents of a drug may render the resulting drug ineffective or toxic. Additionally, the alteration of drug constituents is not, unlike the quantity of chocolate chips in a cookie, readily detectable because the drug may appear to have the same color and consistency as an unaltered or properly manufactured drug.

INTEGRATED ELECTRONIC SIGNATURES FOR APPROVAL OF PROCESS CONTROL SYSTEM SOFTWARE OBJECTS

RELATED APPLICATION

This application is related to copending U.S. patent application Ser. No. 09/420,182, entitled "Version Control and Audit Trail in a Process Control System," the entire disclosure of which is hereby incorporated in this application.

TECHNICAL FIELD

The present invention pertains to process control systems and, more particularly, to approval of software objects for use in process control systems.

BACKGROUND

Process control systems typically include numerous sets of equipment that are used to carry out certain manufacturing or other control processes. The sets of equipment are coupled to controllers that include process control software instructions for manipulating the equipment in certain manners to effectuate the manufacturing or control processes. Process control software may be arranged in phases, which may be generically related to various types of process steps. For example, a mixing phase may be associated with hardware that carries out a mixing step of a process.

However, due to the generic nature of phases, phases must be modified or customized based on the particulars of the step that they are to execute. For example, a mixing phase, which is generally adapted to operate mixing equipment, must be customized to operate a particular piece of mixing equipment for particular time durations at particular speeds. Recipes are commonly used to customize or modify phases. As the name implies, recipes are sets of instructions downloaded to process control hardware for carrying out specific tasks such as, for example, making cookies, producing pharmaceuticals or controlling other processes. Recipes are typically more specific than phases and, in fact, include the use of phases therein. For example, a cookie-making recipe may include a mixing step that could be carried out by a mixing phase. However, in contrast to the mixing phase, the cookie making recipe specifies the duration and speed at which mixing should be carried out. Accordingly, the recipe specifies the parameters that define the operation of the mixing phase.

As will be readily appreciated, altering a recipe executed by a process control system could drastically affect the operation of the process control system. For example, altering a chocolate chip cookie recipe could affect the number of chocolate chips used in the cookie dough, the consistency of the cookie dough or the baking time for the cookies. Accordingly, downloading a recipe that has been accidentally altered or otherwise changed in an unauthorized manner could detrimentally affect the output of a process control system, resulting in products that do not comply with product specifications and, as a result, lost profits.

While the alteration of a recipe for products such as cookies may yield cookies that are obviously flawed (e.g., not thoroughly cooked, not enough chocolate chips, etc.), not all recipe alterations will result in products with immediately perceptible flaws. For example, cookies having too much salt may not be easily discovered during the production process. Consumers, however, may notice the saltiness of the cookies and may complain to the manufacturer, which may then determine that the recipe for the cookies was altered in an unacceptable manner. Despite the fact that some consumers may be upset, the consequences of an unauthorized alteration of a cookie recipe are not life threatening.

While, in some cases like cookie production, unauthorized recipe alteration may, at worst, lead to consumer dissatisfaction, unauthorized alteration of recipes used in, for example, pharmaceutical production may have more serious implications. A recipe alteration that changes the quantities or constituents of a drug may render the resulting drug ineffective or toxic. Additionally, the alteration of drug constituents is not, unlike the quantity of chocolate chips in a cookie, readily detectable because the drug may appear to have the same color and consistency as an unaltered or properly manufactured drug.

Further, many recipes involve significant investment in production capacity, time and/or material and, thus, having to scrap a recipe in progress may have a substantial adverse financial impact on the entity carrying out the recipe as well as any other entities that expect to receive product output from execution of the recipe. For example, recipes for making products that involve fermentation such as wine, beer, cheese, etc. often require weeks or months of process time as well as substantial material investments.

Typically, recipes for process control systems, as well as other software modules or objects such as units, phases, etc. are written by an engineer or scientist who requests various entities such as, for example, research or production groups, to approve the recipe or other software before it is downloaded to the process control system. However, the approval process for process control system software is, at best, typically carried out by circulating a memorandum or a request for approval or, at worst, even more informal. Additionally, there is rarely an impediment, other than a working knowledge of the process control system and the recipes and other software objects implemented therein, to prevent downloading unapproved software to the process control system.

SUMMARY

In accordance with one aspect, a software object approval system and method for use in a process control system electronically generates identification information representing a group of entities whose approval is needed prior to implementing a software object within the process control system. In addition the system and method may receive from each entity represented within the identification information an electronic indication regarding approval of the software object and may use a first software routine to prevent the process control system from implementing the software object until each entity represented within the identification information approves the software object. Still further, the system and method may use a second software routine to selectively enable the process control system to implement the software object based on the electronic indications.

In accordance with another aspect, a software object approval system and method for use in a process control system determines whether a software object is approved by a group of entities and implements the software object within the process control system if the software object is approved by the group of entities.

In yet another aspect, a software object approval system method for use in a process control system determines that a software object is not approved in response to receiving an electronic indication that at least one of a plurality of entities has not approved the software object. The system and method may also determine that the software object is approved in response to receiving another electronic indication that each one of the plurality of entities has approved the software object. In addition, the system and method may enable downloading of the software object to the process control system if the software object is approved.

DETAILED DESCRIPTION

The methods and systems for controlling the approval and downloading of software objects such as, for example, recipes, in process control systems described in detail below may be used to enable a software object author to specify the persons or groups of reviewers or signers that must authorize a software object before the object is downloaded to or implemented within the process control system. The reviewers or signers may be notified by a number of different techniques and, upon notification, may review the software object and approve or reject the software object. If each of the reviewers approves the software object, the software object may be made available for download to the process control system. Additional functionality may include enabling various persons or entities (e.g., reviewers, authors, business groups or others) to check the approval status of a software object.

While the software object approval system and method is described by way of example below as being used for the approval and downloading of recipes, which may include one or more software objects, within a process control system, the system and method described herein may also be advantageously used for other types of software objects such as, for example, units, phases, graphics, etc. Further, the software object approval system and method described by way of example herein, may be used to approve and download a single software object at one time and/or groups of related or unrelated software objects at one time.

Additionally, as will be readily appreciated, the software object approval system and method described herein could be advantageously used in connection with version control software. One exemplary type of version control software is disclosed in a patent application entitled "Version Control and Audit Trail in a Process Control System," which was filed on Oct. 18, 1999, was assigned U.S. Ser. No. 09/420,182 and is owned by the assignee of the present patent.

Figure 1:
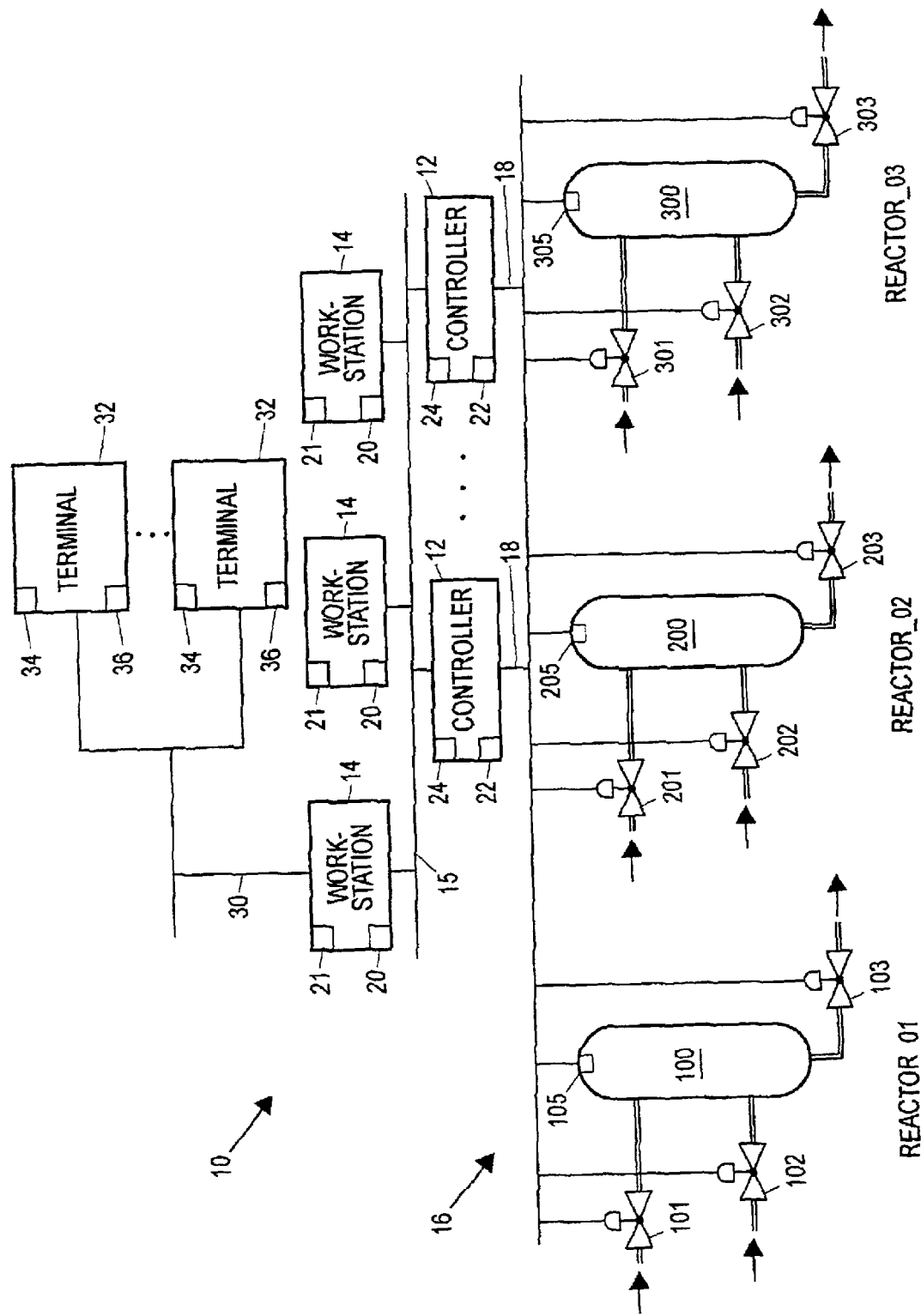
FIG. 1 is a partial block diagram of a process control system that uses one or more control routines having alias names and/or dynamic reference parameters to perform control of process equipment.

Referring now to FIG. 1, a process control system 10 includes controllers 12 coupled to a plurality of workstations 14 via an ethernet connection 15. The controllers 12 are also coupled to devices or equipment associated with a process (generally designated by the reference numeral 16) via a set of communication lines or a bus 18. The controllers 12, which may be, by way of example only, the DeltaV™ controllers sold by Fisher-Rosemont Systems, Inc., are capable of communicating with control elements, such as field devices and function blocks within field devices distributed throughout the process 16 to perform one or more process control routines, which are preferably implemented using object-oriented programming techniques and, thus, software objects, to thereby implement desired control of the process 16. The workstations 14 (which may be, for example, personal computers) may be used by one or more engineers or other users to design process control routines or software objects to be executed by the controllers 12, to communicate with the controllers 12 to download such process control routines or software objects and to receive and display information pertaining to the process 16 during operation of the process 16. Each of the workstations 14 includes a memory 20 for storing applications, such as configuration design applications, and for storing data, such as configuration data pertaining to the configuration of the process 16. Each of the workstations 14 also includes a processor 21 that executes the applications to enable a user to design and/or modify process control routines or software objects and to download these process control routines or software objects to the controllers 12. Likewise, each of the controllers 12 includes a memory 22 for storing configuration data and process control routines to be used to control the process 16 and includes a processor 24 that executes the process control routines to implement a process control strategy. If the controllers 12 are DeltaV controllers, they may provide a graphical depiction of the process control routines within the controllers 12 to a user via one of the workstations 14 illustrating the control elements within the process control routine and the manner in which these control elements are configured to provide control of the process 16.

The system may also include a network 30 to which one or more of the workstations 14 may be connected. The network 30 may be implemented using any suitable network such as, for example, the Internet, an intranet, a local area network (LAN), a wide area network (WAN) or any other suitable network. Although the network 30 is shown as having hardwired connections, it will be readily appreciated that such a network could be a wireless network or could be a network including both hardwired and wireless portions.

A number of terminals 32 may also be connected to the workstations 14 via the network 30. Each of the terminals 32 may include a memory 34 coupled to a processor 36 that is adapted to execute instructions stored on the memory 34. In one exemplary embodiment, the terminals 32 may be personal computers or any like processing devices that may include the same or more processing power and memory than is available in conventional personal computers known today.

Returning to the description of the balance of the process control system 10 of FIG. 1, the controllers 12 are communicatively connected via the bus 18 to three sets of similarly configured reactors referred to herein as Reactor_01, Reactor_02 and Reactor_03. Reactor_01 includes a reactor vessel 100, two input valves 101 and 102 connected to control fluid inlet lines that provide fluid to the reactor vessel 100 and an output valve 103 connected to control fluid flow out of the reactor vessel 100 via an outlet fluid line. A device 105, which may be a sensor, such as a temperature sensor, a pressure sensor, a fluid level meter, etc. or some other equipment such as an electrical heater or a steam heater, is disposed in or near the reactor vessel 100. Similarly, Reactor_02 includes a reactor vessel 200, two input valves 201 and 202, an output valve 203 and a device 205. Likewise, Reactor_03 includes a reactor vessel 300, two input valves 301 and 302, an output valve 303 and a device 305. As illustrated in FIG. 1, the controllers 12 are communicatively coupled to the valves 101–103, 201–203 and 301–303 and to the devices 105, 205 and 305 via the bus 18 to control the operation of these elements to perform one or more operations with respect to the reactor units. Such operations may include, for example, filling the reactor vessels, heating the material within the reactor vessels, dumping the reactor vessels, cleaning the reactor vessels, etc.

The valves, sensors and other equipment illustrated in FIG. 1 may be any desired kind or type of equipment including, for example, Fieldbus devices, standard 4–20 mA devices, HART devices, etc and may communicate with the controllers 12 using any known or desired communication protocol such as the Fieldbus protocol, the HART protocol, the 4–20 mA analog protocol, etc. Still further, other types of devices may be connected to and be controlled by the controllers 12. Also, other controllers may be connected to the controllers 12 and to the workstations 14 via the ethernet communication link 15 to control other devices or areas associated with the process 16 and the operation of such additional controllers may be coordinated with the operation of the controllers 12 illustrated in FIG. 1 in any desired manner.

Generally speaking, the process control system 10 of FIG. 1 may be used to implement batch processes in which, for example, one of the workstations 14 or the controllers 12 executes a batch executive routine, which is a high-level control routine that directs the operation of one or more of the reactor units (as well as other equipment) to perform a series of different steps (commonly referred to as phases) needed to produce a product, such as a food product, a drug or other pharmaceutical product, etc. The steps or phases are typically implemented using software objects that can be instantiated and executed by one of more of the processors 21 and 24 within the system 10.

To implement different phases, the batch executive routine uses what is commonly referred to as a recipe, which is a software object that specifies the steps to be performed, the amounts and times associated with the steps and the sequence of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine within the controllers 12 will execute a different control algorithm for each one of these phases. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batch runs in the reactor units illustrated in FIG. 1, control routines may be used to control other desired devices to perform any other desired batch process runs or to perform continuous process runs, if desired.

At a high level, in a relevant portion of the operation, a person or entity at one of the workstations 14 may create or modify recipes or other software objects and may request approval from various authorizing entities such as, for example, production, engineering, quality assurance or management. The authorizing entities may use the workstations 14 or the terminals 32 to review the recipe and/or other software object(s) in question and approve or reject the recipe and/or other software object(s). The approval or rejection of the software objects in question may be communicated to the person or entity that requested approval of the objects. Once a software object has been approved by all the entities from which approval was requested, the software object may be downloaded to one of the controllers 12 for implementation or execution within the process control system 10.

The same phases or steps of a batch process can be implemented on each of the different reactor units of FIG. 1 at the same or at different times. Furthermore, because the reactor units of FIG. 1 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (during which the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105.

Figure 2:
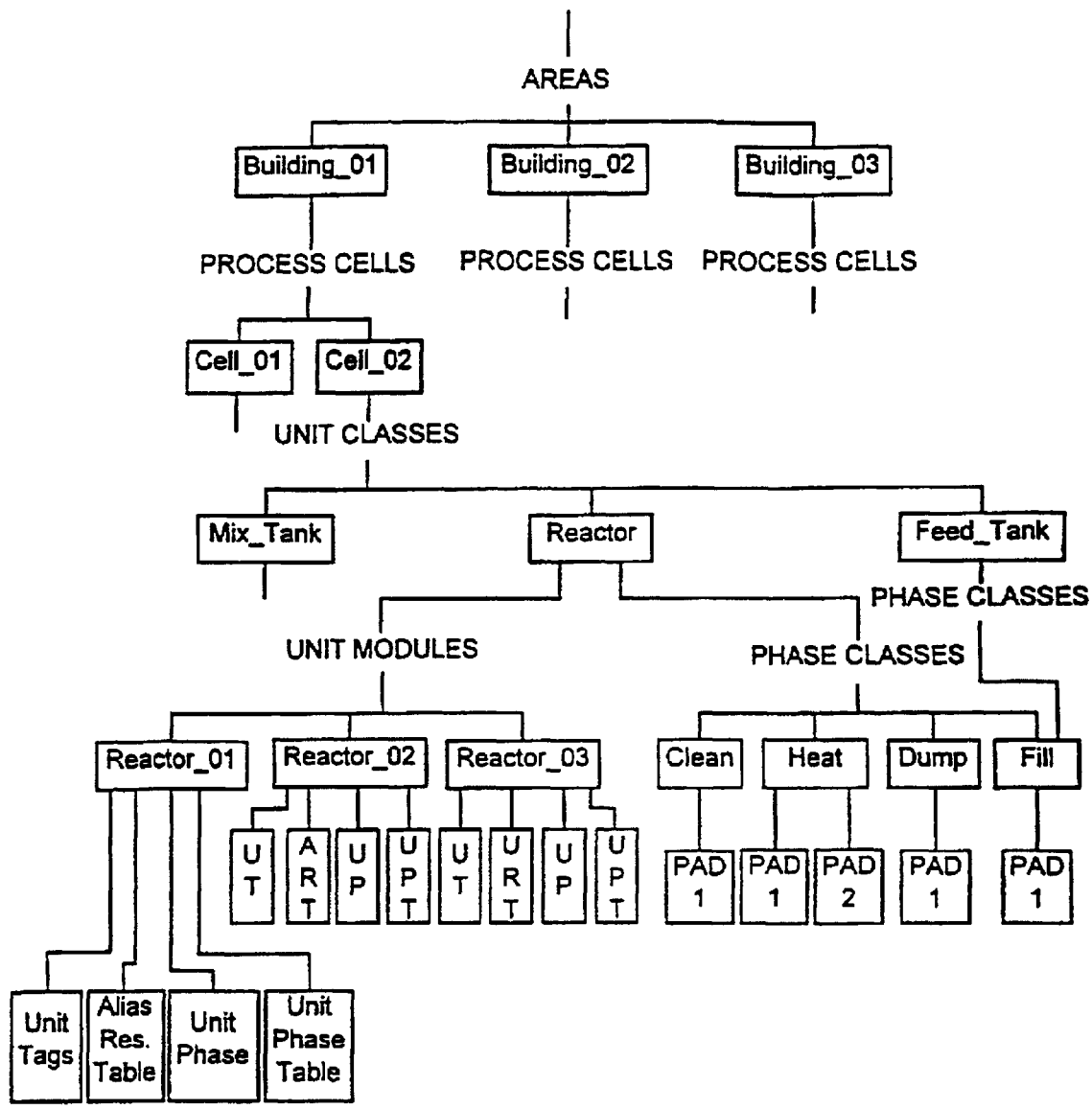
FIG. 2 is a block diagram of an object structure illustrating a logical hierarchy or configuration of the process control system of FIG. 1.

The object tree of FIG. 2 illustrates specific objects, which are implemented using software routines, with boxes while general categories of objects (or object types) are indicated above the objects in the tree with no box. As illustrated in FIG. 2, the process control system 10 includes one or more areas that may be, for example, buildings or other geographical area designations within a process control plant. In the object tree of FIG. 2, the process 16 has three area objects named Building_01, Building_02 and Building_03. Each area object may be divided into process cells, each of which corresponds to a different aspect of the process being performed in the area. The Building_01 area object of FIG. 2 is illustrated as including two process cell objects designated Cell_01 and Cell_02. Cell_01 may, for example, be related to making a component of a product used in Cell_02. Each cell object may include zero or more unit classes, which identify different categories or groupings of hardware used in the process cell. Generally speaking, a unit class is a named object that holds a common configuration of a set of related equipment and, more particularly, is a collection of units that have very similar, if not identical, process instrumentation, each of which performs a very similar, if not identical, function within a process. Unit class objects are typically named to describe the types of units within the process control system to which they belong. FIG. 2 includes a Mix_Tank unit class, a Reactor unit class and a Feed_Tank unit class. Of course, in most process control systems or networks, many other types of unit classes will be provided or defined including, for example, dryer units, feedheader units, and other individual or logical groupings of hardware.

As illustrated for the Reactor unit class of FIG. 2, each unit class object may have unit module objects and phase class objects associated therewith. Unit module objects generally specify certain instances of replicated hardware within the named unit class while phase classes generally specify the phases that can be applied to the unit modules associated with the unit class. More particularly, a unit module object is a named object that holds all of the variables and unit phases (defined hereinafter) for a single process unit and is typically named to identify specific process equipment. For example, the Reactor unit class of FIG. 2 has Reactor_01, Reactor_02 and Reactor_03 unit modules, which correspond to Reactor_01, Reactor_02 and Reactor_03 illustrated in FIG. 1, respectively. The Mix_Tank unit class and the Feed_Tank unit class will similarly have particular unit modules corresponding to particular hardware or equipment within the process 16. However, for the sake of simplicity, none of the equipment associated with the Mix_Tank or the Feed_Tank unit classes is illustrated in FIG. 1.

A phase class is a named object that holds the common configuration for a phase that can run on the multiple units belonging to the same unit class and on multiple different unit classes. In essence, each phase class is a different control routine (or phase) that is created and used by the controllers 12 to control unit modules within the same or different unit classes. Typically, each phase class is named in accordance with the verb that describes an action performed on a unit module. For example, as illustrated in FIG. 2, the Reactor unit class has a Fill phase class, which is used to fill any one of the reactor vessels 100, 200 or 300 of FIG. 1, a Heat phase class, which is used to heat any one of the reactor vessels 100, 200 or 300 of FIG. 1, a Dump phase class, which is used to empty any one of the reactor vessels 100, 200 or 300 of FIG. 1, and a Clean phase class, which is used to clean any one of the reactor vessels 100, 200 or 300 of FIG. 1. Of course, there can be any other phase classes associated with this or any other unit class. The Fill phase class is associated with both the Reactor unit class and the Feed_Tank unit class and, thus, can be used to perform fill functions on Reactor unit modules as well as Feed_Tank unit modules.

A phase class may generally be thought of as a software routine or object that may be called by the batch executive routine to perform some function needed in an overall batch process, as defined by the recipe for that batch process. A phase class may include zero or more phase input parameters, which are basically the inputs provided to the phase class software routine or object from the batch executive routine or another phase class; zero or more phase output parameters which are basically the outputs of the phase class routine passed back to the batch executive routine or to another phase class; zero or more phase messages, which may be messages to be displayed to the user regarding the operation of the phase class, information related to other phase classes with which the phase class is associated in some manner; and zero or more phase algorithm parameters, which cause parameters to be created in phase logic modules (PLMs) or unit phases based on this phase class. These phase algorithm parameters are used as temporary storage locations or variables during the execution of the phase and are not necessarily visible to the user or to the batch executive routine. The phase class includes one or more phase algorithm definitions (PADs) that, generally speaking, are the control routines used to implement the phase. Also, the phase class has a list of associations to zero, one, two or more unit classes, and this list defines the unit classes for which this phase class and, consequently, the PAD of the phase class, can be applied. The Fill phase class list of associations includes both the Reactor unit class and the Feed_Tank unit class.

Figure 3:
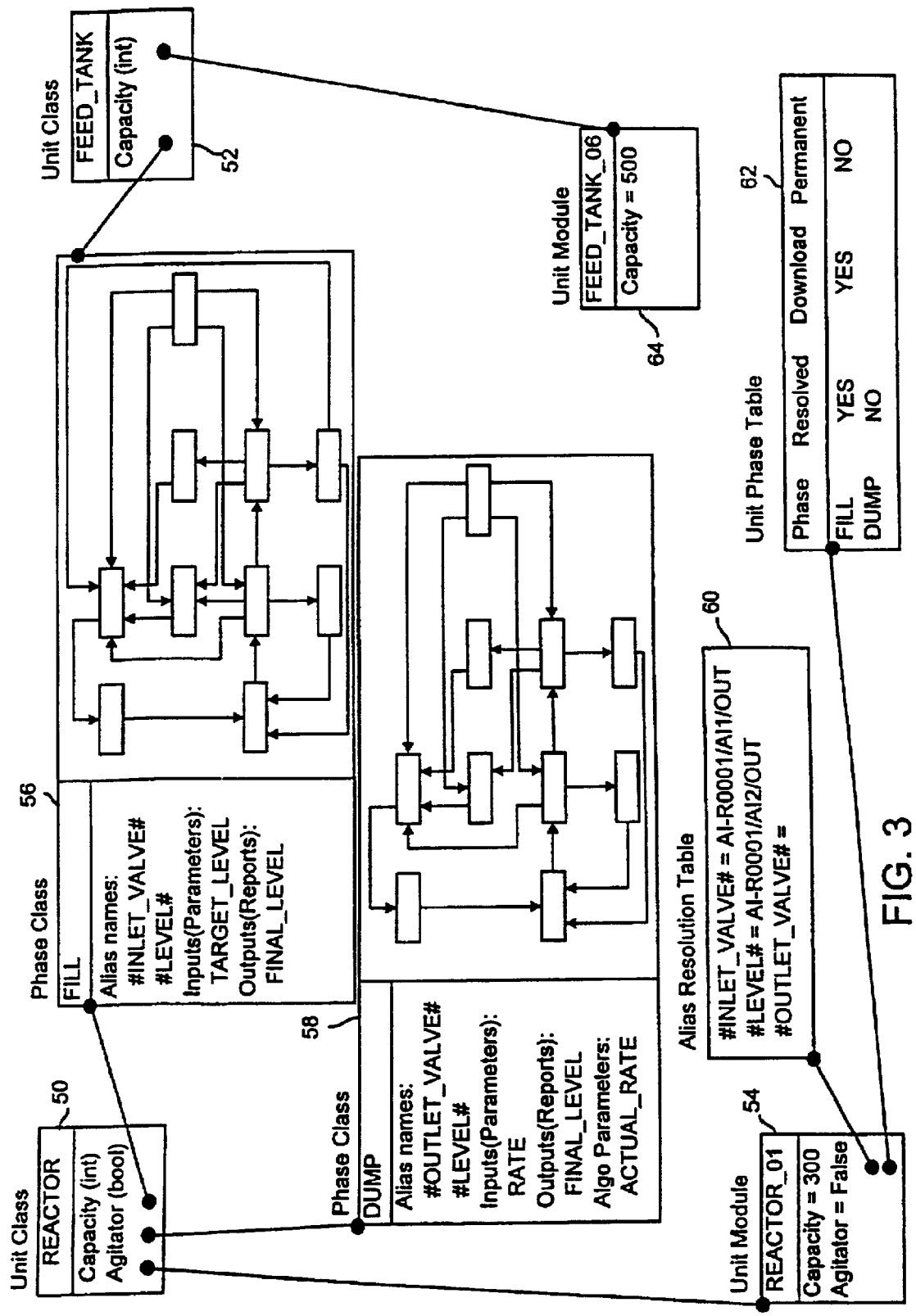
FIG. 3 is a more detailed block diagram of a portion of the object structure of FIG. 2.

FIG. 3 depicts a more detailed version of some of the objects illustrated in FIG. 2 and the interrelationships between these objects. Two unit classes are depicted in FIG. 3, namely, a Reactor unit class 50 and a Feed_Tank unit class 52. The Reactor unit class 50 has one unit module 54, namely Reactor_01. While others may exist, they are simply not illustrated in FIG. 3. The unit module 54 defines some of the reactor parameters associated with the Reactor unit class 50, namely, that the capacity of the Reactor_01 is 300 and that the Reactor_01 does not include an agitator. Likewise, two phase classes are associated with the Reactor unit class 50 including a Fill phase class 56 and a Dump phase class 58. The Fill phase class 56 includes a PAD (illustrated as an SFC in graphical form on the right side thereof) that has been designed using two alias names, namely, #INLET_VALVE# and #LEVEL#. These alias names are actually used in the boxes illustrated in the PAD of the Fill phase class 56 but may, alternatively, be used anywhere else within the logic of the PAD. The Fill phase class 56 also includes an input defined as TARGET_LEVEL and an output defined as FINAL_LEVEL. While the alias names are indicated as being delimited or marked by a number sign (#), any other identifier could be used to define an alias name that must be replaced upon instantiation of a phase. Similarly, the Dump phase class 58 includes a PAD, illustrated on the right hand side thereof in graphical form, having alias names of #OUTLET_VALVE# and #LEVEL#, an input defined as RATE, an output defined as FINAL_LEVEL and an algorithm parameter (used by the PAD) defined as ACTUAL_RATE, which may be used as a temporary storage location during execution of the PAD.

Figure 4:
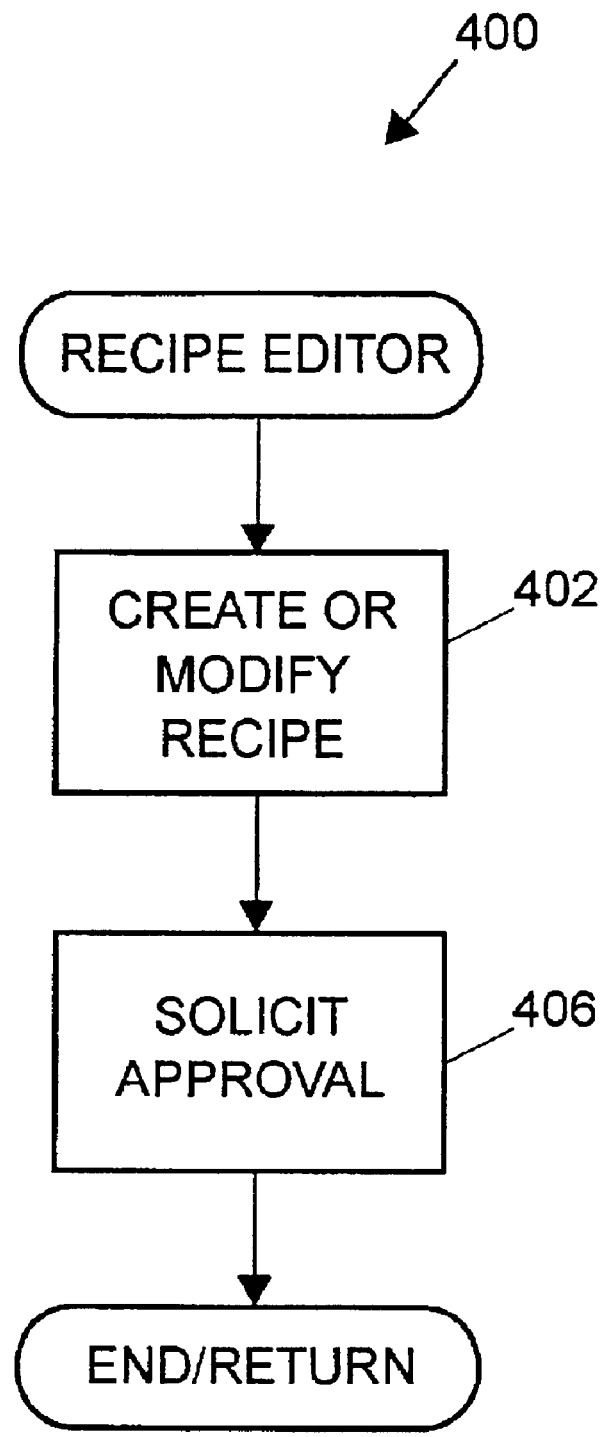
FIG. 4 is an exemplary flow diagram of a recipe editor routine.

Turning now to FIG. 4, a recipe editor routine 400, which may be executed by one or more of the processors 21 of the workstations 14, begins execution at block 402, at which a user or operator creates or modifies a recipe, which may include modification of the software objects associated therewith, for use in the process control system 10. As will be readily appreciated, a user may create or modify recipes or other software objects using techniques described in conjunction with FIGS. 1–3 or using any other suitable techniques. After the recipe has been created or suitably modified, control passes from block 402 to block 406. As discussed in greater detail below in connection with FIGS.

5–11, an authorization setup routine 404 (FIG. 5) may be executed at least once prior to execution of the recipe editor routine 400, or any other time prior to the modification and/or downloading of a recipe or other software objects to the system 10. In general, authorization setup may include, but is not limited to, specifying persons or entities (e.g., signers) from which approval is needed to implement a recipe or other software object, or deleting or modifying signers.

At block 406, approval is solicited from each of the signers specified during the authorization setup for approving the recipe created or modified at block 402. Approval solicitation may include, but is not limited to, sending electronic mail to the signers that are specified to review the recipe in connection with the authorization setup routine 404, running a report that indicates approval status for each of the specified signers, sending an instant message to the signers that are to review the recipe or sending notification to the signers via any other suitable communication method. After approval has been solicited from each signer at block 406, the recipe editor routine 400 ends execution or returns control to another routine that called the recipe editor routine 400.

Figure 5:
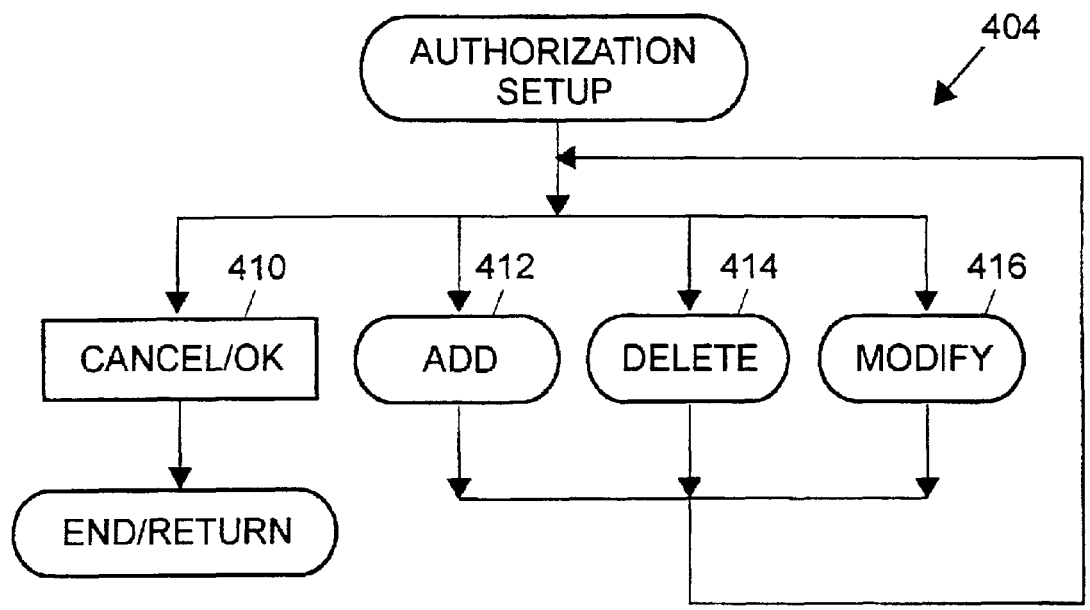
FIG. 5 is an exemplary flow diagram of an authorization setup routine.
Figure 6:
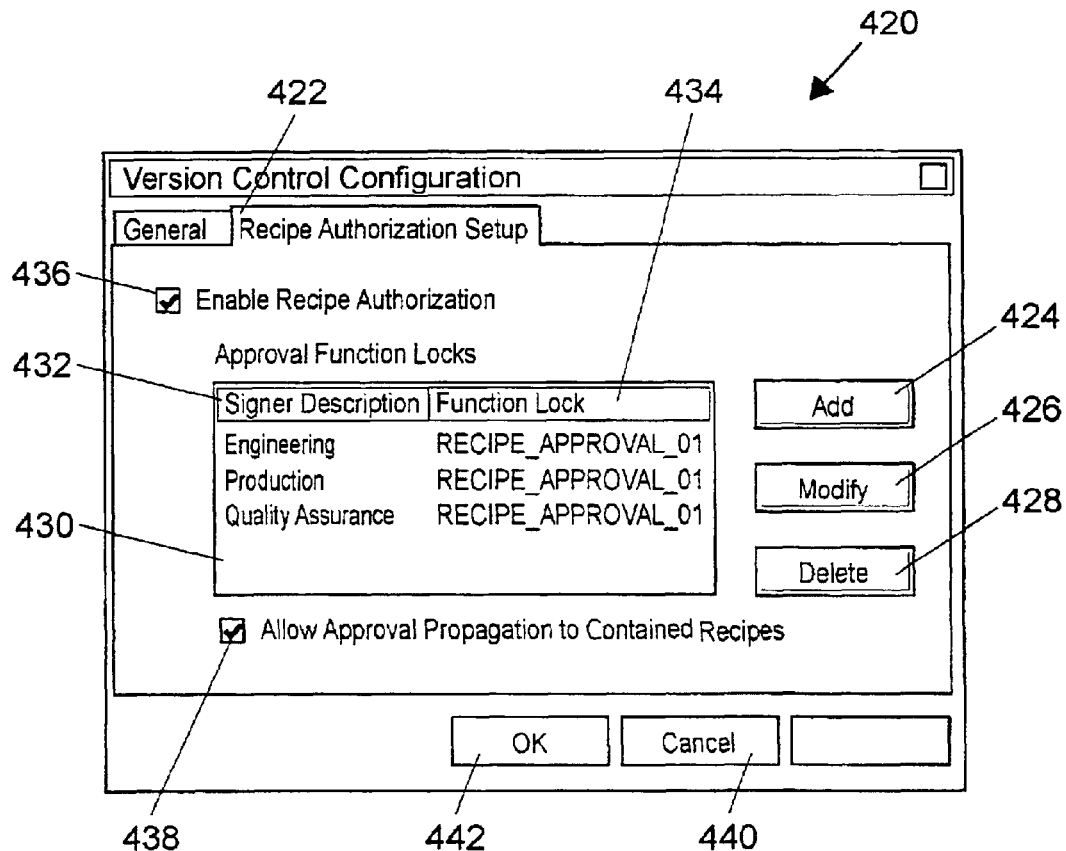
FIG. 6 is an exemplary user interface associated with the authorization setup routine of FIG. 5.

Further detail of the authorization setup routine 404 is provided in conjunction with FIGS. 5 and 6, which respectively disclose a flow diagram and a user interface screen for the authorization setup routine 404. While the authorization setup routine 404 is typically executed once at system startup, the authorization setup routine 404 could, instead, be executed more than once if desired. In general, as shown in FIG. 5, once the authorization setup routine 404 has been executed, a user may opt to cancel execution of the routine at cancel/ok block 410. Alternatively, the user may opt to add, delete or modify recipe signers at blocks 412, 414 or 416, respectively. After addition, deletion or modification of signers, control passes from blocks 412, 414 or 416 and enables a user to select to cancel or end operation of the authorization setup routine 404 at the block 410 or to again add, delete or modify signers using blocks 412–416. If the user opts to cancel or end the authorization setup routine 404 operation at block 410, the authorization setup routine 404 ends.

A user interface 420, as shown in FIG. 6, includes a recipe authorization setup tab 422, which allows a user to select interface buttons 424, 426 or 428 to add, modify or delete signers. The add, modify and delete interface buttons 424–428 correspond to (and may be selected to invoke the functions performed by) the add, delete and modify blocks 412–416 shown in FIG. 5. Further details on each of the blocks 412–416 and, by implication, the interface buttons 424–428 are provided in conjunction with FIGS. 7–11. As signers are added, modified or deleted, the status of the signers is shown in a text box 430. As shown in FIG. 6, the text box 430 includes a signer description column 432 that lists the names of the signers, which may be the names of persons or entities, and also includes a function lock column 434 listing the function locks that corresponding signers are required to have, thereby controlling access to an approval. For example, as shown in FIG. 6, the recipe is to be reviewed and signed off on by engineering, production and quality assurance, which correspond to function locks of RECIPE_APPROVAL_01–RECIPE_APPROVAL_03.

Also shown in FIG. 6 are two check boxes 436 and 438, which correspond to enable recipe authorization and allow approval propagation to contained recipes (i.e., sub-recipes). In operation, when the check box 436 is checked, the enable recipe authorization features of the system are enabled and the authorization setup process is enabled. The checkbox 438, when unchecked, indicates that the user will not have the option to propagate approvals. Conversely, if the checkbox 438 is checked, the user will have the option of propagating approvals for sub-recipes. For example, a main recipe may be composed of or may contain two or more sub-recipes to which an approval associated with the main recipe may be automatically propagated. Of course, such automatic propagation of approvals for recipes may result in a significant time savings, particularly for recipes that include a large number of sub-recipes.

The user interface 420 also includes cancel and ok interface buttons, which are denoted by reference numerals 440 and 442, respectively. The interface buttons 440 and 442 correspond to the cancel/ok block 410 of FIG. 5 and allow a user to exit the authorization setup routine 404. While both interface buttons 440 and 442 enable a user to exit the authorization setup routine 404, the cancel interface button 440 ends the authorization setup routine 404 without including the changes made to the recipe authorization setup. Conversely, the ok interface button 442 allows the user to exit the authorization setup routine 404 and preserves the changes made to the authorization setup while using the user interface 420.

Figure 7:
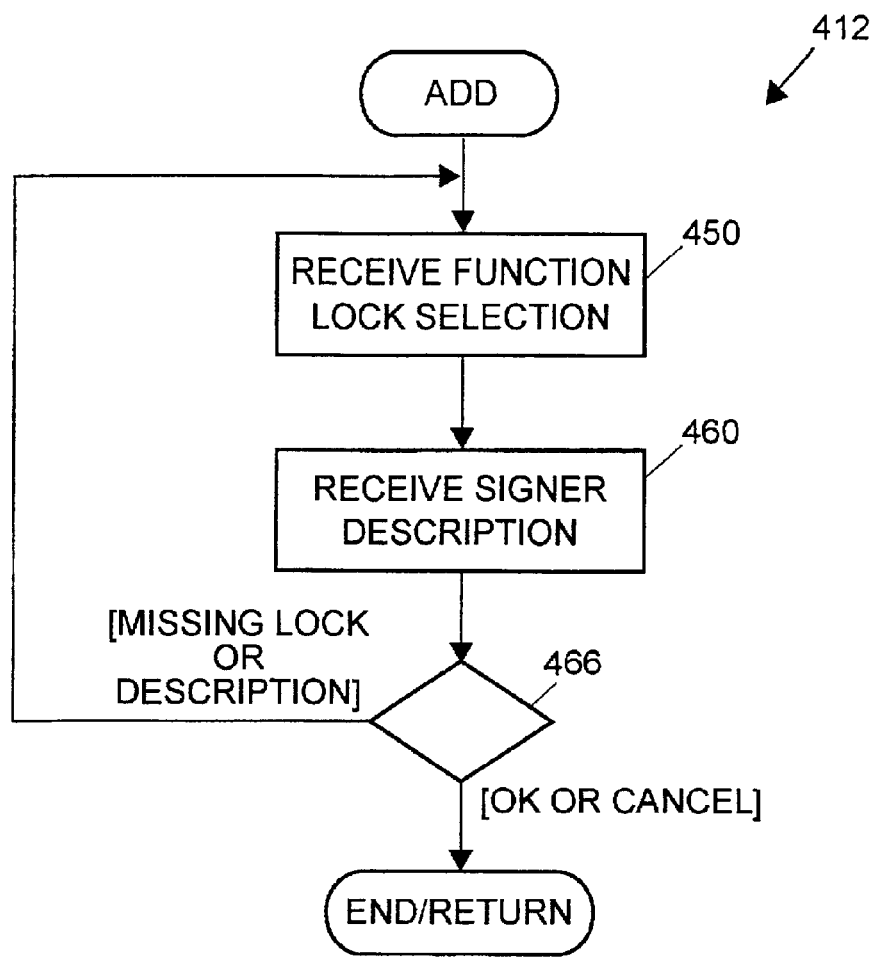
FIG. 7 is an exemplary flow diagram of an add routine.
Figure 8:
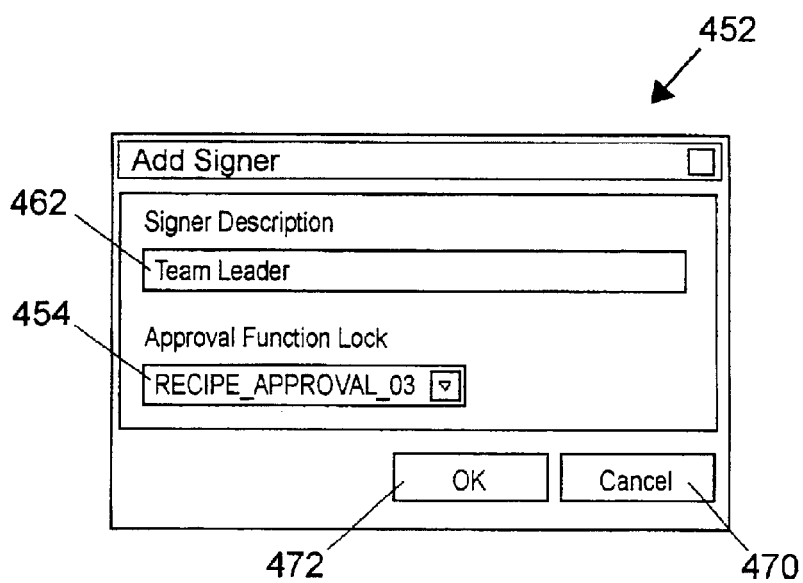
FIG. 8 is an exemplary user interface associated with the add routine of FIG. 7.

Turning now to FIG. 7, further details of the block 412, which represents an add routine, are provided. The add routine 412 begins execution at block 450, which receives the function lock selection provided by the user. As shown in FIG. 8, a graphical user interface or popup window 452 may include an approval function lock box 454 into which a user may input the name of the approval function lock. For example, as shown in FIG. 8, the box 454 may include an indication that the selection approval function lock is RECIPE_APPROVAL_03.

Returning to FIG. 7, after block 450 has received the function lock selection, block 460 receives a signer description provided by the user. For example, as shown in the user interface 452 of FIG. 8, the user may input a signer description in a block 462. By way of example, the description "Team Leader" is shown in block 462, which indicates that the user desires to add team leader as a signer having an approval function lock of RECIPE_APPROVAL_03.

After the function lock selection and the signer description have been received at blocks 450 and 460, respectively, control passes to block 466, which determines if either of the function lock or signer description is missing or if cancel or ok interface buttons, shown in FIG. 8 at reference numerals 470 and 472 respectively, have been selected. If the lock or description is missing, control passes from block 466 to block 450. Alternatively, if block 466 determines that the cancel or ok interface buttons 470 and 472 have been selected by the user, the add routine 412 ends its execution and returns control to the authorization setup routine 404 of FIG. 5. As described with respect to the user interface 420 of FIG. 6, actuation of the cancel interface button 470 causes the add routine 412 to end its execution without saving changes made during the execution thereof. Conversely, as previously noted, actuation of the ok interface button 472 causes the add routine 412 to end and save changes made during the execution of the add routine 412. If a new approver or signer is added by the add routine 412, any previously approved recipes (i.e., recipes for which all originally required approvals have been received) automatically become unauthorized until approval from the newly added signer is obtained.

Figure 9:
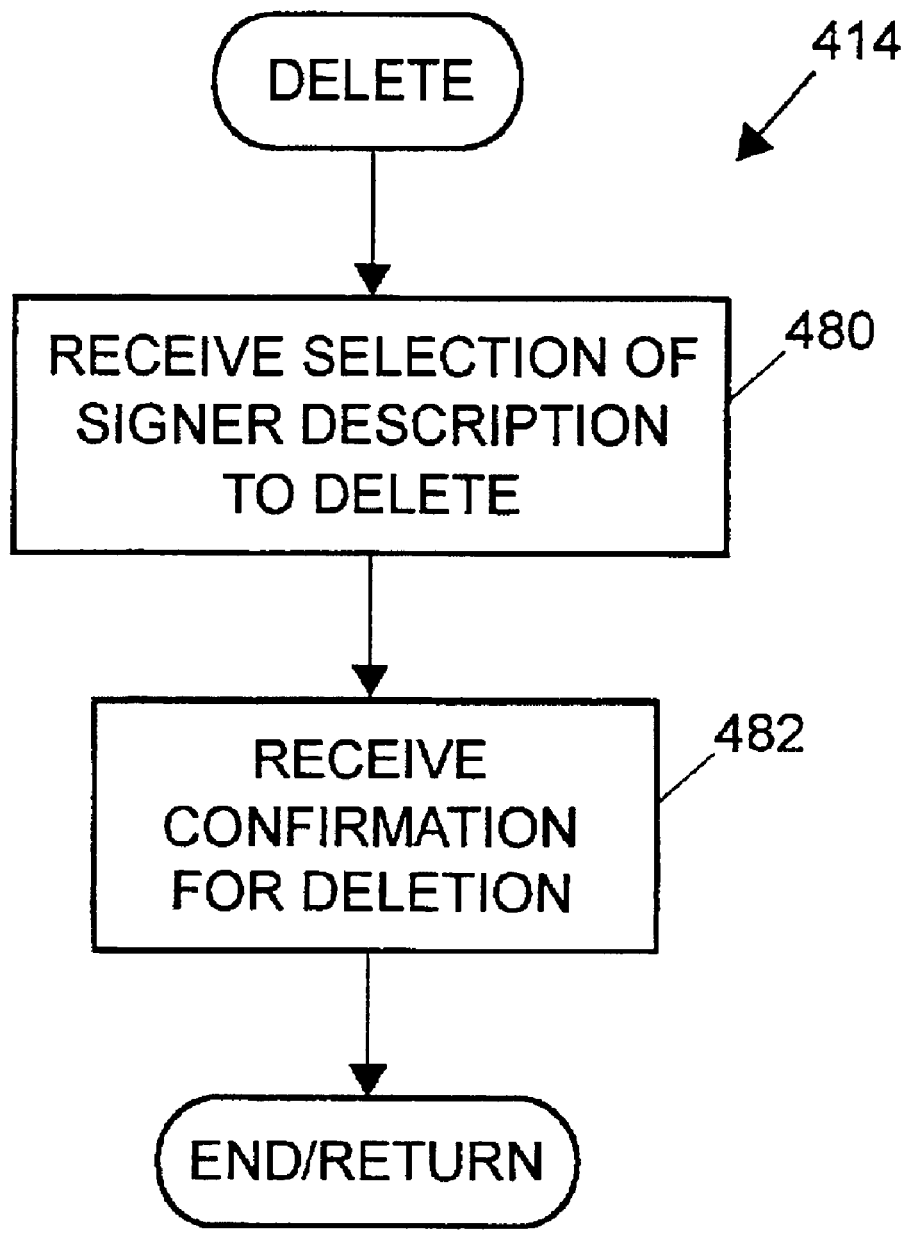
FIG. 9 is an exemplary flow diagram of a delete routine.

Further detail of the delete routine 414 is provided in connection with FIG. 9, which operates in connection with the user interface 420 of FIG. 6. In particular, the delete routine 414 begins execution at block 480, which receives the selection of the signer description to be deleted. The user may provide such a selection by selecting a signer description shown in the text box 430 of the user interface 420 of FIG. 6. After the user selects the description to be deleted, the user then actuates the delete interface button 428 to declare his or her intention to delete the selected signer description or signer. After block 480 completes execution, control passes to block 482, which receives confirmation for the deletion requested by the user. For example, after a user selects the signer description to be deleted and actuates the delete interface button 428, the delete routine 414 may request the user to confirm his or her desire to delete the selected signer description via a user interface graphic presented to the user on a display screen. Such a graphic may include ok or cancel interface buttons, wherein the actuation (e.g., selection via a mouse, keyboard, etc.) of the ok interface button would confirm the user's desire to delete the selected signer description and the cancel interface button would abort the deletion of the selected description. After confirmation for the deletion has been received at block 482, the delete routine 414 ends its execution and returns control to the authorization setup routine 404.

Figure 10:
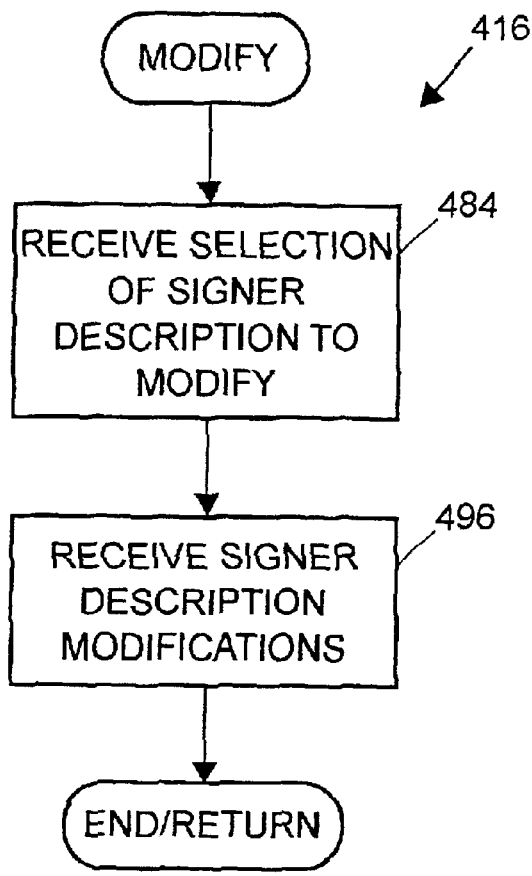
FIG. 10 is an exemplary flow diagram of a modify routine.
Figure 11:
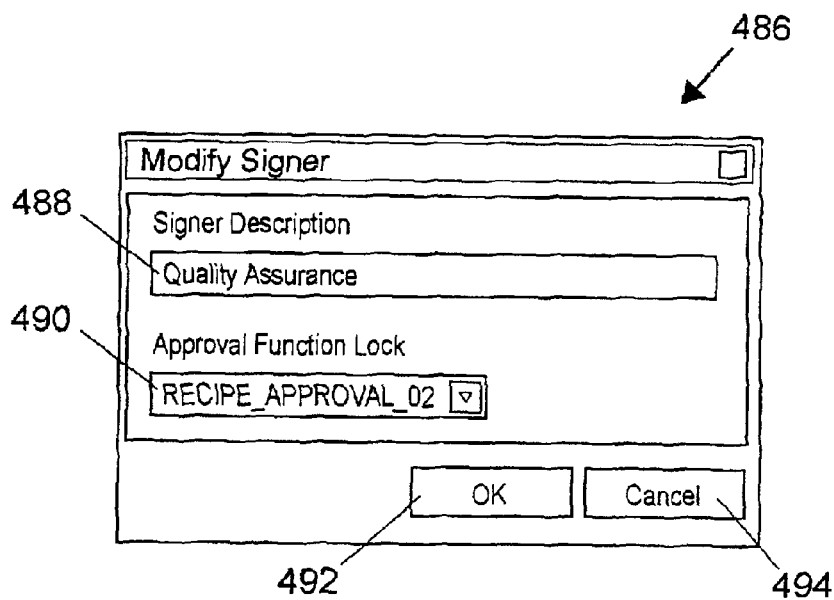
FIG. 11 is an exemplary user interface associated with the modify routine of FIG. 10.

Further detail regarding the modify routine 416 of FIG. 5 is provided in conjunction with FIGS. 10 and 11. The modify routine 416 begins execution at block 484, which receives from the user a selection of the signer description to modify. For example, the user may select the signer named Quality Assurance in FIG. 6 and may then actuate the modify interface button 426. After actuation of the modify interface button 426, a user interface such as, for example, a user interface 486 shown in FIG. 11, may be presented to the user and may include a signer description box 488 and an approval function lock box 490. The user interface 486 may also include ok and cancel interface buttons 492 and 494. After the modify routine 416 has received a selection of the signer description to modify (in this case, the signer Quality Assurance has been selected for modification), control passes from block 484 to block 496. The block 496 receives signer description modifications, such as, for example, changes in the signer name, approval lock function or any other suitable changes. For example, after the user provides a signer description in block 488, the user may modify the name of the signer or may modify the approval lock function displayed in block 490 and may select either of the ok or cancel interface buttons 492 and 494. As described previously, actuation of the ok interface button 492 saves the modifications made to the signer description. Conversely, actuation of the cancel interface button 494 ends the modify routine 416 without saving changes made. In any case, actuation of either of the interface buttons 492 and 494 ends the execution of the modify routine 416 and returns control to the authorization setup routine 404 of FIG. 5. As with the add routine 412, modification of a signer or approver automatically results in any previously approved recipe requiring that signer's approval to become unauthorized.

Thus far, a description of adding, deleting and modifying signers or recipe reviewers or approvers has been provided. The described routines or routines embodying the functionality described in connection with these routines may be implemented within any of the workstations 14 and/or terminals 32 of FIG. 1.

While the preceding figures and description have pertained to the specification of signers, FIGS. 12–16 pertain to the review, approval or rejection processes that may be carried out by signers. The routines and user interfaces shown in FIGS. 12–16 may be implemented on the terminals 32 and/or the workstations 14 of FIG. 1. In particular, the one or more of the memories 20 and 34 may store instructions that may be executed by one or more of the processors 21 and 36 to carry out operations representative of the blocks in the routines.

Figure 12:
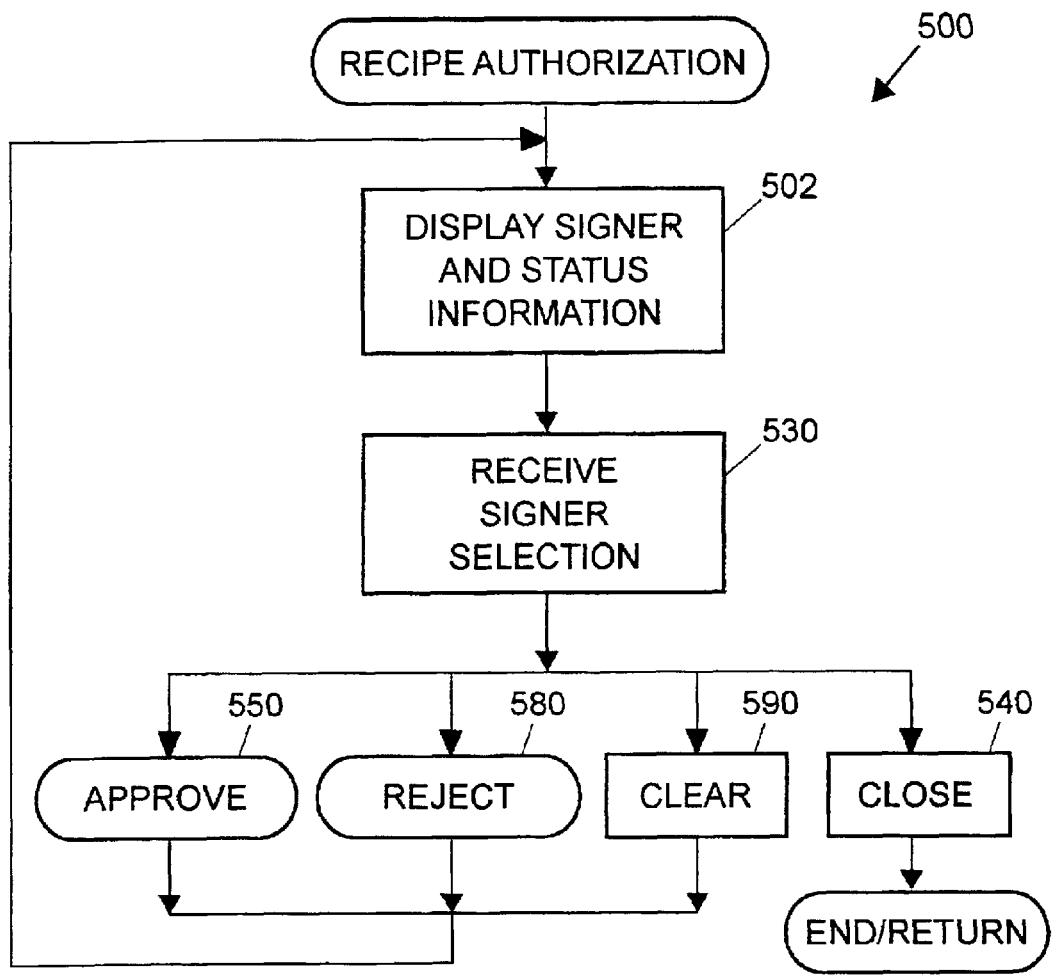
FIG. 12 is an exemplary flow diagram of a recipe authorization routine.
Figure 13:
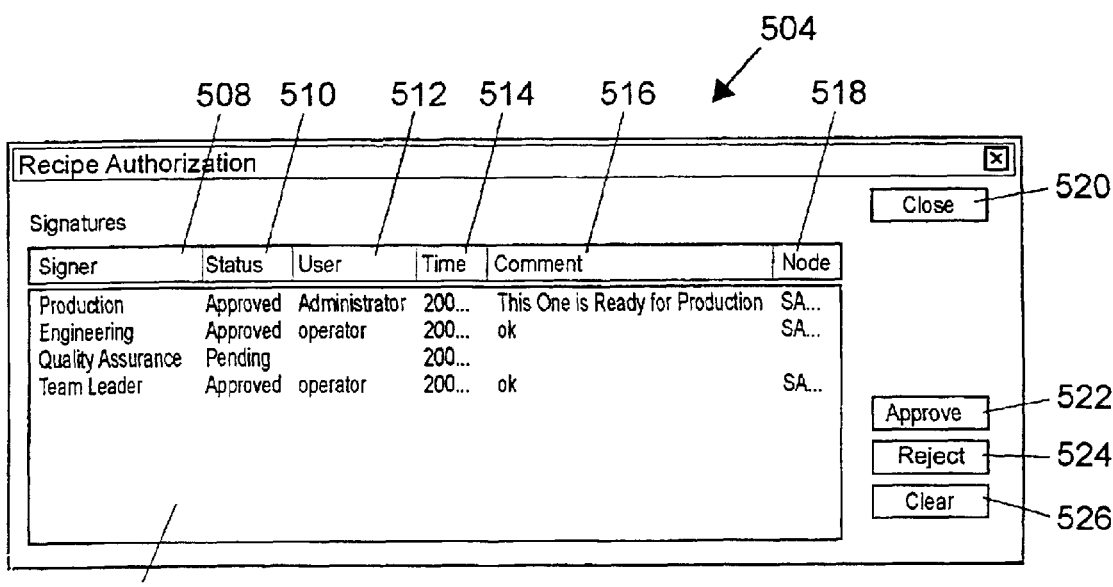
FIG. 13 is an exemplary user interface associated with the recipe authorization routine of FIG. 12.

Turning now to FIG. 12, a recipe authorization routine 500 begins execution at block 502, which displays signer and status information pertinent to the recipe being reviewed. For example, a user interface 504 of FIG. 13 may include a text box 506 having a number of columns 508–518 that may represent signer identity, status, user type, time, comment and node. The signer column 508 lists the signatures required for approval of the recipe and the status column 510 lists the state of the signature for each signer. For example, signature status may be blank or pending, approved or rejected, wherein a blank status or pending status may represent that the signer has not reviewed the recipe. The user column 512 lists the user type responsible for the most recent signature change. The time column 514 lists the time at which most recent change of the signature was made. The comment column 516 lists any comments made by the signer when they approved or rejected the recipe and the node 518 represents the systems node at which the signer approved or rejected the recipe. For example, the node may be any one of the terminals 32 and/or the workstations 14 of FIG. 1. In addition to the text block 506, the user interface 504 may include close, approve, reject and clear interface buttons 520–526, which will be described in conjunction with the recipe authorization routine 500 of FIG. 12.

After block 502 displays signer and status information, block 530 receives the signer selection, which may be manifest by the user by selecting any of interface buttons 520–526. In particular, if the user actuates the close interface button 520, control of the recipe authorization routine 500 passes from block 530 to block 540, which closes the user interface 504, ends execution of the recipe authorization routine 500 and returns control to any routine that called the recipe authorization routine 500.

Figure 14:
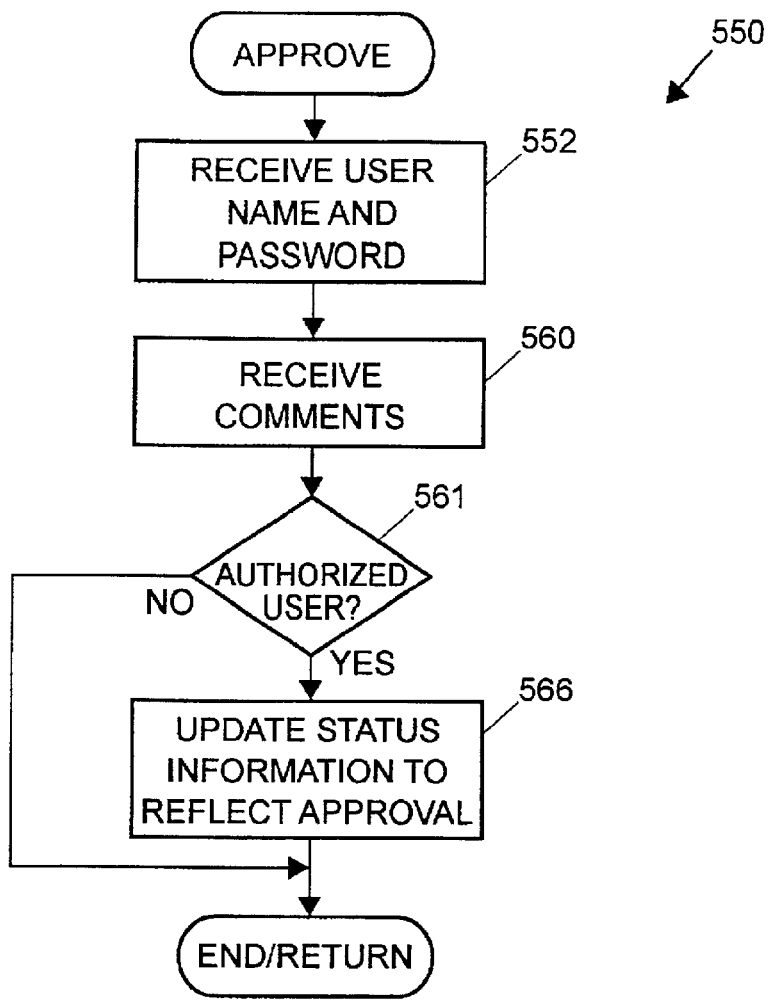
FIG. 14 is an exemplary flow diagram of an approve routine.

Alternatively, if the user actuates the approve interface button 522, control passes from block 530 to block 550, which represents an approve routine. As shown in FIG. 14, the approve routine 550 begins execution at block 552, which receives a user name and password that are provided by the user. A user interface 554, an example of which is shown in FIG. 15, may include user name and password boxes 556 and 558 into which the user may enter their user name and password.

After block 552 has completed execution, control passes to block 560, which receives user comments made during approval. For example, the user interface 554 of FIG. 15 may include a text box 562 into which comments may be keyed. After block 560 completes execution, block 561 determines if the user is authorized. The authorization check performed at block 561 may verify that the user name and/or password received at block 552 are valid and/or whether the user associated with that user name and password is authorized to make such an approval. If it is determined at block 561 that the user is authorized, then control passes to block 566. Block 566 updates the status information to reflect approval. For example, the text box 562 includes the text comments "This one is ready for production," which is also reflected in FIG. 13 as the comment made by the production signer when approving the recipe after the execution of block 566. If it is determined at block 561 that either or both of the user name and password received at block 552 are not authorized, then the approve routine 550 ends.

Figure 15:
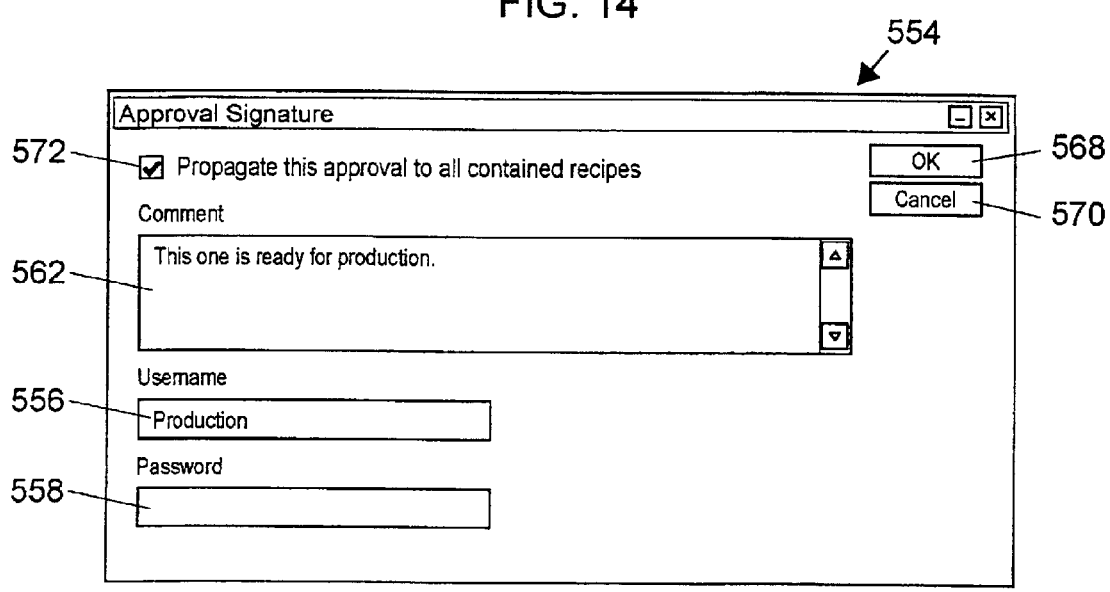
FIG. 15 is an exemplary user interface associated with the approval routine of FIG. 14.

As described in conjunction with many of the previous user interface screens, the user interface 554 of FIG. 15 includes ok and cancel interface buttons 568 and 570, which may be used to end execution of the approve routine 550 while either saving or discarding the changes made during the execution of the routine. Additionally, as shown in FIG. 15, a check box 572 may be provided to enable a user to opt to propagate the approval to any contained or sub-recipes.

Figure 16:
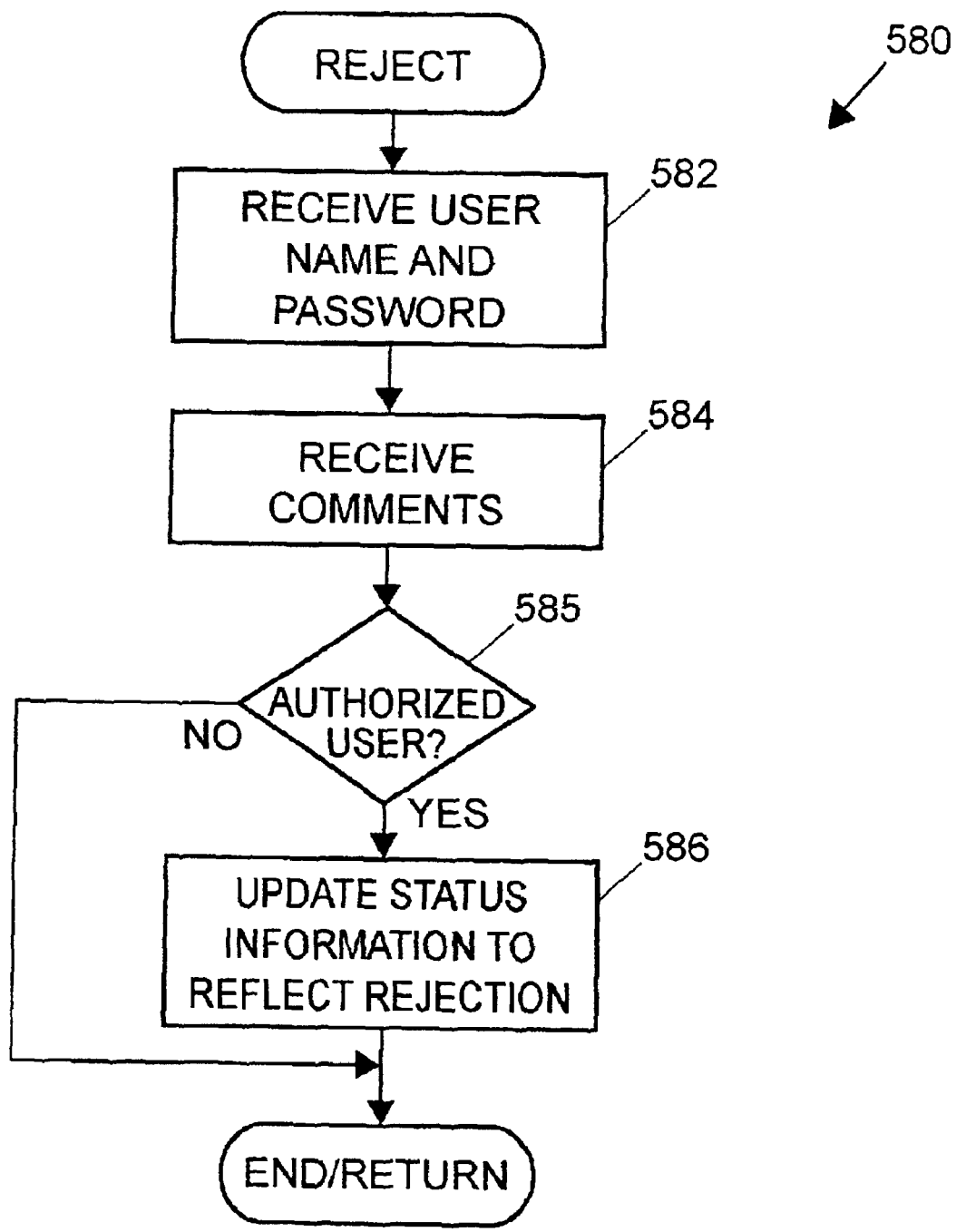
FIG. 16 is an exemplary flow diagram of a reject routine.

Referring back to FIGS. 12 and 13, if the user actuates the reject interface button 524 of FIG. 13, control passes from block 530 to block 580 of the recipe authorization routine 550. Block 580 represents a reject routine, further details of which may be found in FIG. 16. As shown in FIG. 16, execution of the reject routine 580 begins at block 582 where the user inputs a user name and a password before control passes to block 584. At block 584, a signer may input comments made during the process of rejecting the recipe. The operations of blocks 582 and 584 are similar to the operations of blocks 552 and 560 of the approve routine 550 shown in FIG. 14, except that blocks 582 and 584 are used in conjunction with rejecting the recipe. After the block 584 completes execution, control passes to block 585, which performs an authorization check similar to that performed at block 561 shown in FIG. 15. If it is determined that a user is authorized at block 585, then control passes to block 586.

Block 586 updates status information to reflect rejection of the recipe by the user. The update status information block 586 may generate information that would be reflected on the user interface 504 of FIG. 13 to reflect the fact that a signer has rejected a recipe. Although not shown in the figures, the reject routine 580 may also employ a graphical user interface similar to the user interface 554 of FIG. 15, which is used to approve recipes.

Returning again to FIGS. 12 and 13, if a user actuates the clear interface button 526 of FIG. 13, control passes from block 530 to block 590 of the recipe authorization routine 500. The block 590 may be used to clear a signature. For example, one of the signers shown in FIG. 13 may be selected by a user and cleared using the interface button 526. However, once a recipe has been downloaded for execution by, for example, the controller 12 (FIG. 1) or the workstation 14 (FIG. 1), the effect of an approval signature cannot be retracted. In other words, once a recipe (or any other software object) has been downloaded, a signature (i.e., an approval) cannot be cleared or rejected.

Figure 17:
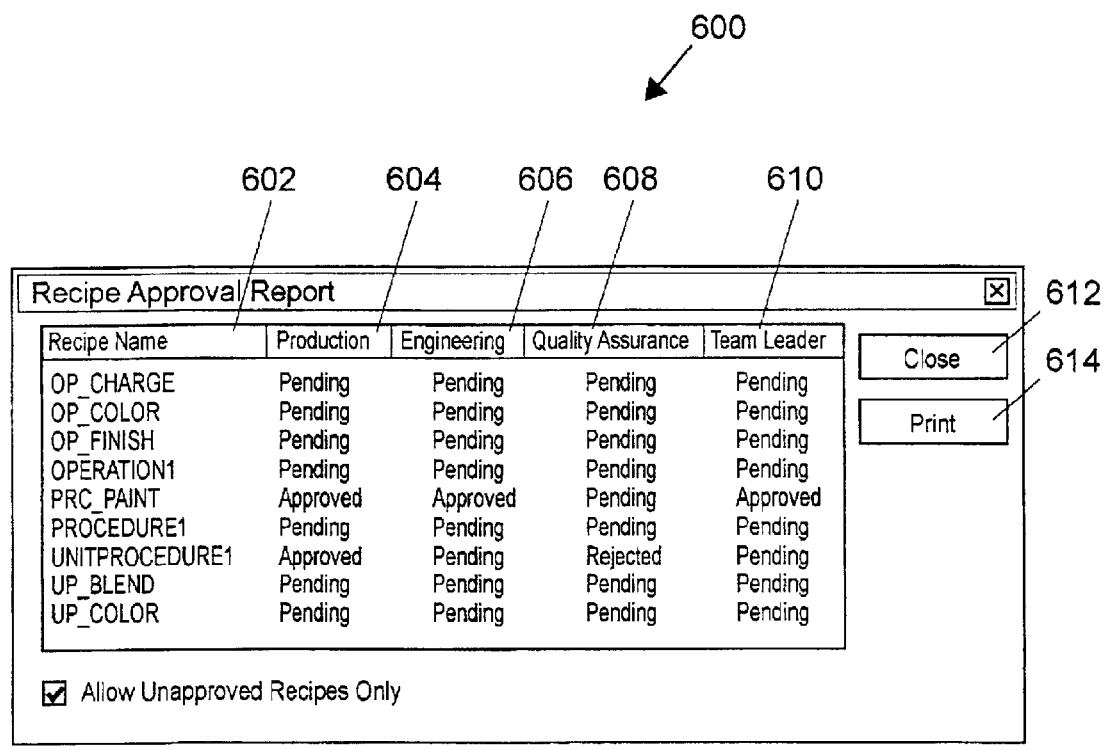
FIG. 17 is an exemplary user interface of showing the status of unapproved recipes.

While the foregoing description pertains to selecting signers and to reviewing recipes, a user interface 600, as shown in FIG. 17, may be used to report the status of recipes within the process control system 10. For example, the user interface 600 may include a number of columns 602–610, which respectively represent recipe name, production, engineering, quality assurance and team leader. Briefly, the recipe name column 602 lists all of the unapproved recipes and columns 604–610 list the status of each recipe with each reviewer or reviewing entity. For example, the recipe named "OP_CHARGE" is pending with each of production, engineering, quality assurance and team leader. In contrast, each of production, engineering, quality assurance and team leader have approved the "PRC_PAINT" recipe, but the same has not been approved by quality assurance. Accordingly, the "PRC_PAINT" recipe is still unapproved. The user interface 600 may also include close and print interface buttons 612 and 614, which may be used to close the user interface 600 or to print the user interface 600 to show the information contained in the columns 602–610.

Figure 18:
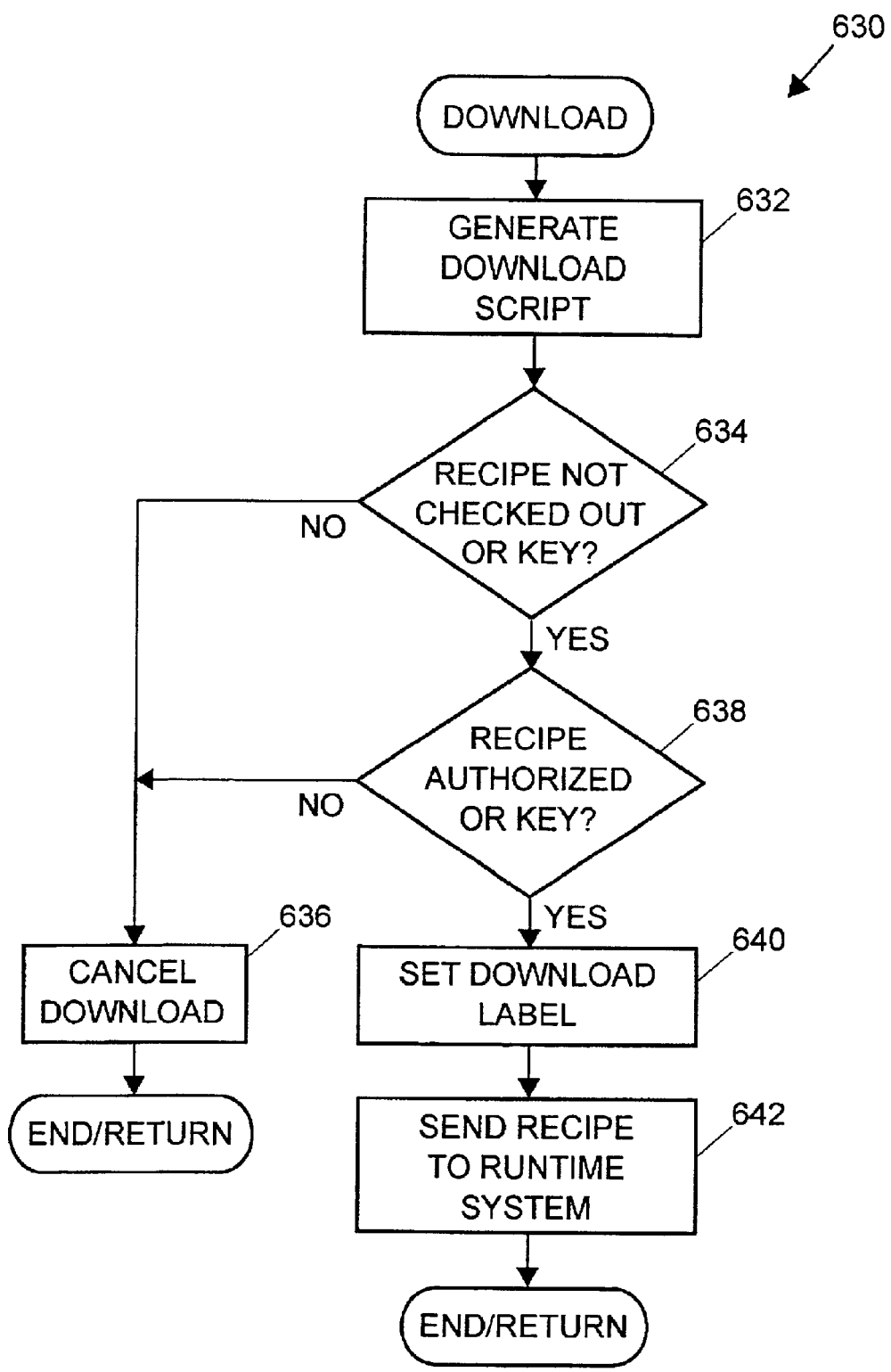
FIG. 18 is an exemplary flow diagram of a download routine.

Once a recipe has been reviewed and approved by all signers, the recipe may be downloaded to or implemented within one or more of the controllers 12, which are shown in FIG. 1. A download routine 630, as shown in FIG. 18, is one method by which downloading may be carried out. The download routine 630 begins execution at block 632, which generates a download script. After the download script has been generated at block 632, control passes to block 634, which determines if the recipe is not checked out (i.e., is checked in) or if the user has supplied a key which enables downloading of a recipe even if the recipe is checked out. Version control software such as the software disclosed in "Version Control and Audit Trail in a Process Control System" may be used in connection with the download routine 630. If block 634 determines that the recipe is checked out and the key has not been provided, control passes to block 636, which cancels the download and ends execution of the download routine 630. Alternatively, if the recipe is not checked out or if the key has been provided, control passes from block 634 to block 638, which determines if the recipe is authorized or if the user has provided a special key which enables downloading of unauthorized recipes. Recipe authorization may include, but is not limited to, insuring that all signers have approved the recipe. If block 638 determines that the recipe is not authorized and the key has not been provided, control passes to block 636, which cancels the download before ending the download routine 630. In the alternative, if block 638 determines that the recipe is authorized or if the key has been provided, control passes to block 640, which sets a download label. The download label may be one or more comment statements or other similar textual information appended to the downloaded item(s) that includes the time, date, version and initiator (or user) of the download. Additionally, the download label includes a detailed list of the individual items (e.g., recipes) being downloaded. The recipe is then sent to the runtime system, which may be embodied in the controllers 12 of FIG. 1, at block 642. After the execution of block 642, the download routine 630 ends execution and returns control to the routine that called it.

From the foregoing, it can be appreciated that a software object that is currently not approved cannot be downloaded or implemented by the system 10 until all signers or approvers associated with that software object have approved the software object. Thus, a new software object or recipe, for example, must be approved by a predetermined list or group of persons and/or other entities (e.g., a list of persons and/or other entities generated by the authorization setup routine 404 (FIG. 5). Additionally, a previously approved software object or recipe that is modified automatically becomes unauthorized and, thus, must be re-approved by all of its corresponding signers or authorizers to download the modified software object or recipe as shown by example at blocks 638 and 640 of FIG. 18.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A software object approval method for use in a process control system on a network, the method comprising:

electronically generating identification information representing a group of two or more entities accessible via the network whose approval is needed prior to implementing a software object within a control device of the process control system, wherein the control device is separate from the group of two or more entities;

receiving via the network from each entity represented within the identification information an electronic indication regarding approval of the software object;

using a first software routine to prevent the control device of the process control system from implementing the software object until each entity represented within the identification information approves the software object;

using a second software routine to selectively enable the process control system to download the software object to the control device based on the electronic indications; and preventing changing of the electronic indications after download of the software object.

2. The method of claim 1, further including electronically notifying each entity within the group of two or more entities to request their approval of the software object.

3. The method of claim 2, wherein electronically notifying each entity within the group of entities includes electronically notifying each entity via a communication network.

4. The method of claim 2, wherein electronically notifying each entity within the group of two or more entities includes sending an electronic mail to each entity.

5. The method of claim 1, wherein the software object is associated with one of a recipe, a unit and a phase.

6. The method of claim 1, wherein receiving the electronic indications regarding approval of the software object includes receiving at least one rejection of a recipe.

7. The method of claim 1, wherein using the second software routine to selectively enable the process control system to download the software object based on the electronic indications includes using the second software routine to download the software object to the process control system if each entity within the group of two or more entities approves the recipe.

8. The method of claim 1, wherein using the second software routine to selectively enable the process control system to download the software object based on the electronic indications includes using the second software routine to prohibit downloading of the software object to the process control system if at least one entity within the group of two or more entities rejects the recipe.

9. The method of claim 1, further including receiving an electronic selection associated with adding an entity to the group of two or more entities.

10. The method of claim 1, further including automatically propagating an approval for the software object to another software object associated with the software object.

11. A software object approval method for use in a process control system connected to a network, the method comprising:

storing identification information representing a group of two or more entities accessible via the network whose approval is needed prior to implementing a software object within a control device of the process control system, wherein the control device is separate from the group of two or more entities;

determining whether the software object is approved by the group of two or more entities by receiving an electronic indication via the network from each entity represented in the identification information;

downloading the software object to the control device of the process control system if the software object is approved by the group of two or more entities;

using a software routine to prevent changing of an approval after download of the software object; and propagating the approval to another software object in response to determining that the software object is approved by the group of two or more entities.

12. The method of claim 11, wherein determining whether the software object is approved by the group of two or more entities includes receiving an electronic indication associated with one of an approval and a rejection of the software object from each entity within the group of two or more entities and approving the software object if the electronic indications include an approval from each entity within the group of two or more entities.

13. The method of claim 11, wherein downloading the software object to the control device within the process control system includes downloading the software object for execution within the control device of the process control system.

14. The method of claim 11, wherein determining whether the software object is approved by the group of two or more entities includes determining that the software object is not approved if any entity within the group of two or more entities has not approved a change associated with the software object.

15. The method of claim 11, wherein determining whether the software object is approved by the group of two or more entities includes determining that the software object is not approved if an authorization parameter associated with any entity within the group of two or more entities has changed prior to downloading the software object within the control system.

16. The method of claim 11, wherein determining whether the software object is approved by the group of two or more entities includes determining that the software object is not approved if the group of two or more entities has changed prior to downloading the software object within the control system.

17. The method of claim 11, wherein determining whether the software object is approved by the group of two or more entities includes determining whether one of a recipe, a unit and a phase is approved by the group of two or more entities.

18. The method of claim 11, wherein determining whether the software object is approved by the group of two or more entities includes electronically notifying each entity within the group of two or more entities to request their approval of the software object.

19. A software object approval method for use in a process control system connected to a network, the method comprising:

storing identification information representing a plurality of entities accessible via the network whose approval is needed prior to implementing a software object within a control device of the process control system, determining that the software object is not approved in response to receiving via the network an electronic indication that at least one of a plurality of entities has not approved the software object;

determining that the software object is approved in response to receiving via the network another electronic indication that each one of the plurality of entities has approved the software object;

electronically enabling downloading of the software object to a control device within the process control system if the software object is approved, wherein the control device is a separate device from each of the plurality of entities; and preventing changing of the another electronic indication after downloading of the software object.

20. The method of claim 19, wherein determining that the software object is not approved in response to receiving the electronic indication that the at least one of the plurality of entities has not approved the software object includes determining that a recipe is not approved.

21. The method of claim 19, wherein determining that the software object is approved in response to receiving the another electronic indication that each one of the plurality of entities has approved the software object includes receiving an electronic communication having an approval from each one of the plurality of entities.

22. The method of claim 19, further including enabling downloading of the software object to the process control system in response to receipt of electronic key information.

23. The method of claim 19, further including associating an unapproved condition with the software object in response to one of a modification of the software object, a modification of information associated with one of the plurality of entities, adding another entity to the plurality of entities, and checking out the software object.

24. A software object approval system for use in a process control system including a processor and connected to a network, the software object approval system comprising:
   a computer readable medium; and
   software stored on the computer readable medium and adapted to be executed by the processor to:
      generate identification information representing a group of two or more entities whose approval is needed prior to implementing a software object within a control device within the process control system, in which the control device is separate from the group of two or more entities;
      receive, via the network, from each entity represented within the identification information an electronic indication regarding approval of the software object;
      prevent the process control system from implementing the software object until each entity represented within the identification information approves the software object;
      selectively enable the process control system to download the software object to the control device based on the electronic indications; and
   prevent changing of the electronic indication after downloading of the software object.

25. The system of claim 24, wherein the software is further adapted to be executed by the processor to electronically notify each entity within the group of two or more entities to request their approval of the software object.

26. The system of claim 24, wherein the software object is associated with one of a recipe, a unit and a phase.

27. The system of claim 24, wherein the software is further adapted to selectively enable the process control system to download the software object based on the electronic indications by downloading the recipe to the process control system if each entity within the group of two or more entities approves the recipe.

28. The system of claim 24, wherein the software is further adapted to be executed by the processor to selectively enable the process control system to implement the recipe based on the indications by prohibiting downloading of the recipe to the process control system if at least one entity within the group of two or more entities rejects the recipe.

29. The system of claim 24, wherein the software is further adapted to be executed by the processor to propagate an approval to another software object associated with the software object.

30. A software object approval system for use in a process control system including a processor and connected to a network, the software object approval system comprising:
   a computer readable medium; and
   software stored on the computer readable medium and adapted to be executed by the processor to:
      store information representing a group of two or more entities accessible via the network whose approval is needed prior to implementing a software object within a control device within the process control system, in which the control device is separate from the group of two or more entities;
      determine whether a software object is approved by the group of two or more entities by receiving an electronic indication via the network from each entity represented in the identification information;
      download the software object to a control device within the process control system if the software object is approved by the group of two or more entities; and
   prevent changing of the approval after downloading of the software object.

31. The system of claim 30, wherein the software is further adapted to be executed by the processor to determine whether the software object is approved by the group of two or more entities by receiving an electronic indication associated with one of an approval and a rejection of the software object from each entity within the group of two or more entities and approving the software object if the electronic indications include an approval from each entity within the group of two or more entities.

32. The system of claim 30, wherein the software is further adapted to be executed by the processor to download the software object within the process control system in response to receipt of the electronic indications by downloading the software object for execution within the process control system.

33. The system of claim 30, wherein the software is further adapted to be executed by the processor to determine whether the software object is approved by the group of two or more entities by determining that the software object is not approved if any entity within the group of two or more entities has not approved a change to the software object.

34. The system of claim 30, wherein the software is further adapted to be executed by the processor to determine whether the software object is approved by the group of two or more entities by determining that the software object is not approved if an authorization parameter associated with any entity within the group of two or more entities has changed prior to implementing the software object within the control system.

35. The system of claim 30, wherein the software is further adapted to be executed by the processor to determine whether the software object is approved by the group of two or more entities by determining that the software object is not approved if the group of two or more entities has changed prior to implementing the software object within the control system.

36. The system of claim 30, wherein the software is further adapted to be executed by the processor to determine whether the software object is approved by the group of two or more entities by determining whether a one of a recipe, a unit and a phase is approved by the group of two or more entities.

37. The system of claim 30, wherein the software is further adapted to be executed by the processor to propagate an approval to another software object in response to determining that the software object is approved by the group of two or more entities.

38. A software object approval system for use in a process control system having a processor and being connected to a network, the software object approval system comprising:
- a computer readable medium; and
- software stored on the computer readable medium adapted to be executed by the processor to:
  - store information representing a plurality of entities accessible via the network whose approval is needed prior to implementing a software object within a control device within the process control system, in which the control device is separate from the plurality of entities;
  - determine that the software object is not approved in response to receiving an electronic indication via the network that at least one of the plurality of entities has not approved the software object;
  - determine that the software object is approved in response to receiving via the network another electronic indication that each one of the plurality of entities has approved the software object;
  - enable downloading of the software object to the control device if the software object is approved; and
- prevent changing of the another electronic indication after downloading of the software object.

39. The system of claim 38, wherein the software is further adapted to be executed by the processor to determine that the software object is not approved in response to receiving the electronic indication that the at least one of the plurality of entities has not approved the software object by determining that a recipe is not approved.

40. The system of claim 38, wherein the software is further adapted to be executed by the processor to determine that the software object is approved in response to receiving the another electronic indication that each one of the plurality of entities has approved the software object by receiving an electronic communication having an approval from each one of the plurality of entities.

41. The system of claim 38, wherein the software is further adapted to be executed by the processor to associate an unapproved condition with the software object in response to one of a modification of the software object, a modification of information associated with one of the plurality of entities, adding another entity to the plurality of entities, and checking out the software object.

* * * * *